(12) United States Patent
Cho et al.

(10) Patent No.: US 9,104,022 B2
(45) Date of Patent: Aug. 11, 2015

(54) ELECTROWETTING DISPLAY DEVICE

(75) Inventors: Hyeon-Gu Cho, Yongin-si (KR);
Sang-Il Kim, Yongin-si (KR); Seung-Jin Baek, Suwon-si (KR); Jin-Woo Choi, Seoul (KR)

(73) Assignee: Amazon Technologies, Inc., Reno, NV (US)

( * ) Notice: Subject to any disclaimer, the term of this patent is extended or adjusted under 35 U.S.C. 154(b) by 522 days.

(21) Appl. No.: 13/595,717

(22) Filed: Aug. 27, 2012

(65) Prior Publication Data

US 2013/0242367 A1     Sep. 19, 2013

(30) Foreign Application Priority Data

Mar. 16, 2012   (KR) .................. 10-2012-0027195

(51) Int. Cl.
*G02B 26/00*     (2006.01)
(52) U.S. Cl.
CPC .................................... *G02B 26/005* (2013.01)
(58) Field of Classification Search
CPC ............... G02B 26/004; G02B 26/005; G02B 2207/115
See application file for complete search history.

(56) References Cited

U.S. PATENT DOCUMENTS

2011/0084944 A1    4/2011   Bae
2013/0328051 A1*  12/2013   Franklin et al. ................ 257/59

FOREIGN PATENT DOCUMENTS

| KR | 2009-211047 | 9/2009 |
|---|---|---|
| KR | 10-2011-0071276 | 6/2011 |
| KR | 10-2011-0074087 | 6/2011 |

OTHER PUBLICATIONS

English Abstract for Publication No. 2009-211047.
English Abstract for Publication No. 10-2011-0071276.
English Abstract for Publication No. 10-2011-0074087.

* cited by examiner

*Primary Examiner* — Jennifer L. Doak
(74) *Attorney, Agent, or Firm* — Lee & Hayes, PLLC

(57) ABSTRACT

An electrowetting display device includes a first substrate, a second substrate, a conductive fluid and a non-conductive fluid. The first substrate includes a first base substrate, a first electrode layer, a hydrophobic insulation layer and a partition wall. The first electrode layer is formed on the first base substrate and includes pixel electrodes spaced apart from each other and a common notch electrode formed between the pixel electrodes. The hydrophobic insulation layer is formed on the first electrode layer. The partition wall is formed surrounding the pixel electrodes and the common notch electrode on the hydrophobic insulation layer. The second substrate is opposite to the first substrate. The conductive fluid and the non-conductive fluid are interposed between the first and second substrates. The conductive fluid and the non-conductive fluid are controlled to vary transmittance of light in accordance with an electric signal applied to the pixel electrodes.

26 Claims, 12 Drawing Sheets

ELECTROWETTING DISPLAY DEVICE

CROSS-REFERENCE TO RELATED APPLICATIONS

This application claims priority under 35 U.S.C. §119 to Korean Patent Application No. 10-2012-0027195, filed on Mar. 16, 2012 in the Korean Intellectual Property Office (KIPO), the contents of which are herein incorporated by reference in their entirety.

TECHNICAL FIELD

Exemplary embodiments of the present invention relate to an electrowetting display device. More particularly, exemplary embodiments of the present invention relate to an electrowetting display device that controls a transmissivity of light.

DISCUSSION OF THE RELATED ART

An electrowetting display device includes a conductive fluid and a non-conductive fluid to display an image by varying a surface tension of the conductive fluid in accordance with a voltage. As the electrowetting display device does not have a polarization plate, flexibility or transmissivity may be increased in comparison with a liquid crystal display device. Moreover, the electrowetting display device has a quick response velocity of about 10 ms or less.

Generally, an electrowetting display device includes an electrode, a hydrophobic insulation layer, a conductive fluid, and a non-conductive fluid. The hydrophobic insulation layer has a hydrophobic property. The term "hydrophobic" may denote that a surface of fluid is not dissolved in water or that water is repelled by the surface of fluid. The wettability is controlled at the hydrophobic insulation layer in accordance with a voltage level applied to the electrode. The term "wettability" may denote that a surface tension of a fluid is decreased and fluid is permitted to spread. According to the degree of wettability, the hydrophobic insulation layer is changed from being hydrophobic to being hydrophilic. The term "hydrophilic" may denote a tendency to interact with water molecules.

In the electrowetting display device, a transparent electrolyte (which is a conductive fluid) causes an opaque oil (which is a non-conductive fluid) to move on the hydrophobic insulation layer to control transmissivity of light. The electrowetting display device expresses a gray scale in accordance with a voltage level applied thereto. During manufacture, the amount of opaque oil filled into a unit pixel of a display device is controlled through an inkjet process.

In a display device having a high display quality, as a size of a unit pixel is decreased, an amount of opaque oil filled into the unit pixel is reduced so that it is difficult to control injection.

Moreover, a boundary area of a unit pixel or an area where opaque oil exits is a non-transmitting area. The non-transmitting area may reduce a transmissivity of light. Thus, in order to enhance a display capacity of a display device, the transmissivity of the unit pixel is increased.

Particularly, in a transparent display device, as opposed to a conventional display device that is not transparent, to increase transmissivity, a non-transmitting area may be limited to occupied about 40% to about 50% of the space of a unit pixel.

SUMMARY

Exemplary embodiments of the present invention provide an electrowetting display device capable of realizing a high display quality.

Exemplary embodiments of the present invention also provide an electrowetting display device capable of increasing a display capacity.

According to one aspect of the present invention, an electrowetting display device includes a first substrate, a second substrate, a conductive fluid and a non-conductive fluid. The first substrate includes a first base substrate, a first electrode layer, a hydrophobic insulation layer and a partition wall. The first electrode layer is formed on the first base substrate and includes plural pixel electrodes spaced apart from each other and a common notch electrode formed between the pixel electrodes. The hydrophobic insulation layer is formed on the first electrode layer. The partition wall is formed surrounding the pixel electrodes and the common notch electrode on the hydrophobic insulation layer. The second substrate is opposite to the first substrate. The conductive fluid and the non-conductive fluid are interposed between the first and second substrates. The relative configuration of the conductive fluid and the non-conductive fluid are varied to control a transmittance of light in accordance with an electric signal applied to the pixel electrodes.

In an exemplary embodiment of the present invention, the pixel electrode may be disposed between adjacent partition walls and the common notch electrode may be disposed between the pixel electrodes forming a main pixel.

In an exemplary embodiment of the present invention, the common notch electrode may be formed at a central area of the main pixel.

In an exemplary embodiment of the present invention, a size of the common notch electrode may be limited to about 30% of a size of the pixel electrodes.

In an exemplary embodiment of the present invention, each of the pixel electrodes may be a reflection electrode reflecting light.

In an exemplary embodiment of the present invention, the second substrate may include a second base substrate and a second electrode layer formed on the second base substrate.

In an exemplary embodiment of the present invention, an identical voltage may be applied to the common notch electrode and the second electrode layer.

In an exemplary embodiment of the present invention, different voltages may be applied to the common notch electrode and the pixel electrodes.

In an exemplary embodiment of the present invention, the hydrophobic insulation layer may include an organic layer formed on the first electrode layer, and a hydrophobic layer formed on the organic layer having a wettability controlled in accordance with an electric signal applied to the pixel electrodes.

In an exemplary embodiment of the present invention, the first substrate may include a light-blocking layer formed on the first base substrate in correspondence with the partition wall.

In an exemplary embodiment of the present invention, the light-blocking layer may include a first light-blocking layer and a second light-blocking layer. The first light-blocking layer may be extended along a first direction and may have a first width identical to a width of the partition wall. The second light-blocking layer may be extended along a second direction substantially perpendicular to the first direction and may have a second width greater than the width of the partition wall.

In an exemplary embodiment of the present invention, the common notch electrode may be disposed between second light-blocking layers adjacent to each other.

In an exemplary embodiment of the present invention, a center portion of the second light-blocking layer may have a convex shape.

In an exemplary embodiment, a center portion of the hydrophobic insulation layer may have a concave shape at a portion of the hydrophobic insulation layer where the second light-blocking layer is formed.

In an exemplary embodiment of the present invention, the light-blocking layer may include a third light-blocking layer extended in a first direction and a second direction substantially perpendicular to the first direction. The third light-blocking layer may have a second width greater than a width of the partition wall.

In an exemplary embodiment of the present invention, the first substrate may further include a switching element formed on the first base substrate providing each of the pixel electrodes with the electric signal.

In an exemplary embodiment of the present invention, a contact hole electrically connected to the switching element may be formed through each of the pixel electrodes.

In an exemplary embodiment of the present invention, a distance interval between the common notch electrode and the contact hole may be about 20 μm or less.

In an exemplary embodiment of the present invention, the first substrate may further include a plurality of data lines and a plurality of gate lines formed on the first base substrate and connected to the switching element. The data lines may be overlapped with the common notch electrode.

According to an aspect of the present invention, an electrowetting display device includes a first substrate, a second substrate, a conductive fluid and a non-conductive fluid. The first substrate includes a first base substrate, a first electrode layer, a hydrophobic insulation layer and a partition wall. The first electrode layer is formed on the first base substrate and includes a first pixel electrode and a second pixel electrode spaced apart from the first pixel electrode. The hydrophobic insulation layer is formed on the first electrode layer. The partition wall is formed surrounding the first and second pixel electrodes on the hydrophobic insulation layer. The second substrate is opposite to the first substrate. The conductive fluid and the non-conductive fluid are interposed between the first and second substrates. The relative configuration of the conductive fluid and the non-conductive fluid are varied to control a transmittance of light in accordance with an electric signal applied to the first and second pixel electrodes. A color filter layer is formed on one of the first and second substrates. The color filter layer includes a first color filter formed on an area corresponding to the first pixel electrode and a second color filter formed on an area corresponding to the second pixel electrode.

In an exemplary embodiment of the present invention, the first and second pixel electrodes are disposed between adjacent partition walls forming one sub-pixel, and plural sub-pixels adjacent to each other form one main pixel.

In an exemplary embodiment of the present invention, each of the color filters may be red, green, blue, or white. The color filters included in the main pixel may be red, green, blue, or white. The color filters may include an equal number of filters of each color.

In an exemplary embodiment of the present invention, different voltages may be applied to the first pixel electrode and the second pixel electrode controlling the conductive fluid and the non-conductive fluid.

In an exemplary embodiment of the present invention, the second substrate may include a second base substrate and a second electrode layer formed on the second base substrate.

In an exemplary embodiment of the present invention, a voltage applied to one of the first and second pixel electrodes may be the same as a voltage applied to the second electrode layer.

An electrowetting display device according to an exemplary embodiment of the present invention, one main pixel configured by plural pixel electrodes is formed. A common notch electrode is formed. An amount of an opaque oil injected into the main pixel may be controlled to realize a high display quality.

Moreover, a partition wall within a main pixel is removed and an opaque oil is gathered into a single area, so that a non-transmitting area may be reduced to increase a transmissivity.

Moreover, a utilizability of a non-transmitting area may be increased and a configuration of a color filter may be arranged so that a tranamittivity per a unit pixel may be increased.

An electrowetting display device includes a first substrate, a second substrate opposite to the first substrate, a transparent fluid, and an opaque fluid. The transparent and opaque fluids are each interposed between the first and second substrates. The relative arrangement of the transparent fluid and the opaque fluid is controlled to vary a transmittance of light in accordance with a received electric signal. The first substrate includes a plurality of pixel electrodes spaced apart from each other, a common notch electrode formed between each of the plurality of pixel electrodes, and a partition wall formed surrounding each of the pixel electrodes of the plurality of pixel electrodes and the common notch electrode.

BRIEF DESCRIPTION OF THE DRAWINGS

The above and other features and aspects of the present invention will become more apparent by describing in detailed exemplary embodiments thereof with reference to the accompanying drawings, in which:

FIGS. 11A and 12B are cross-sectional views illustrating an operation of the electrowetting display device of FIG. 10;

DETAILED DESCRIPTION

Hereinafter, exemplary embodiments of the present invention will be explained in detail with reference to the accompanying drawings.

Figure 1A:
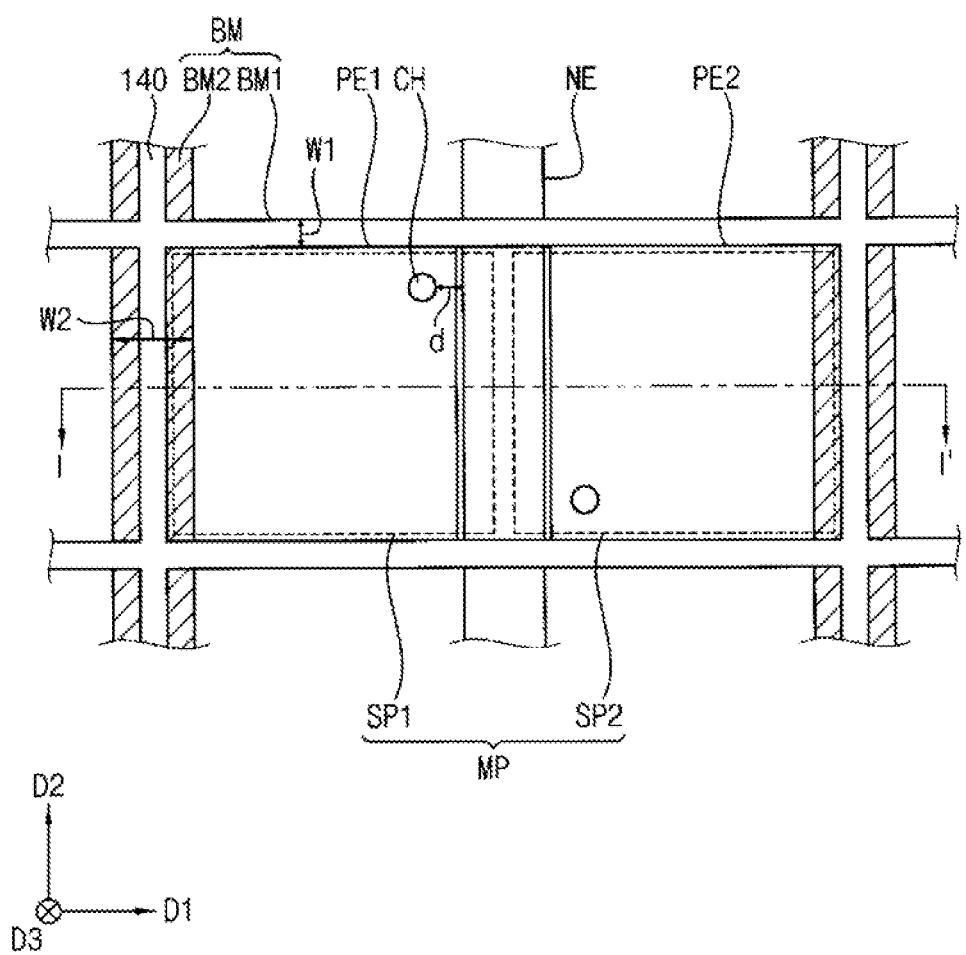
FIGS. 1A and 1B are plan views illustrating an electrowetting display device according to an exemplary embodiment of the present invention.
Figure 1B:
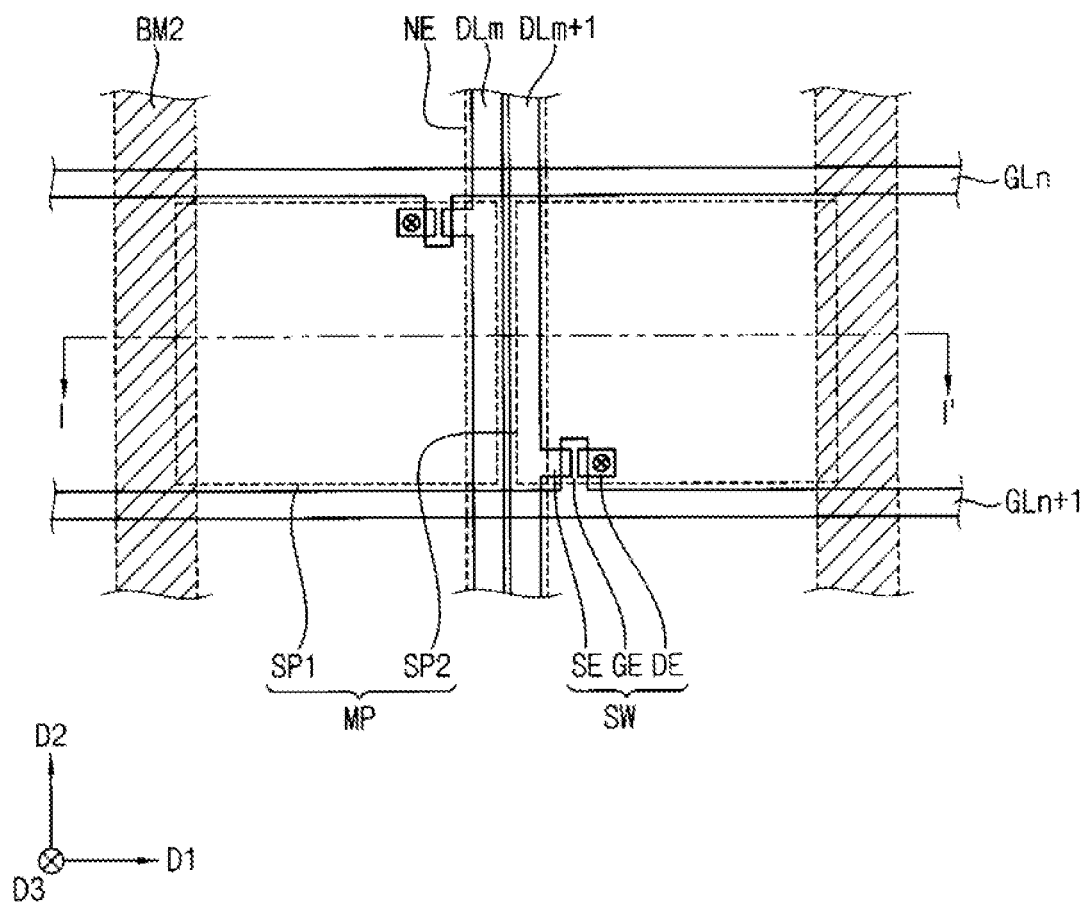
Figure 2:
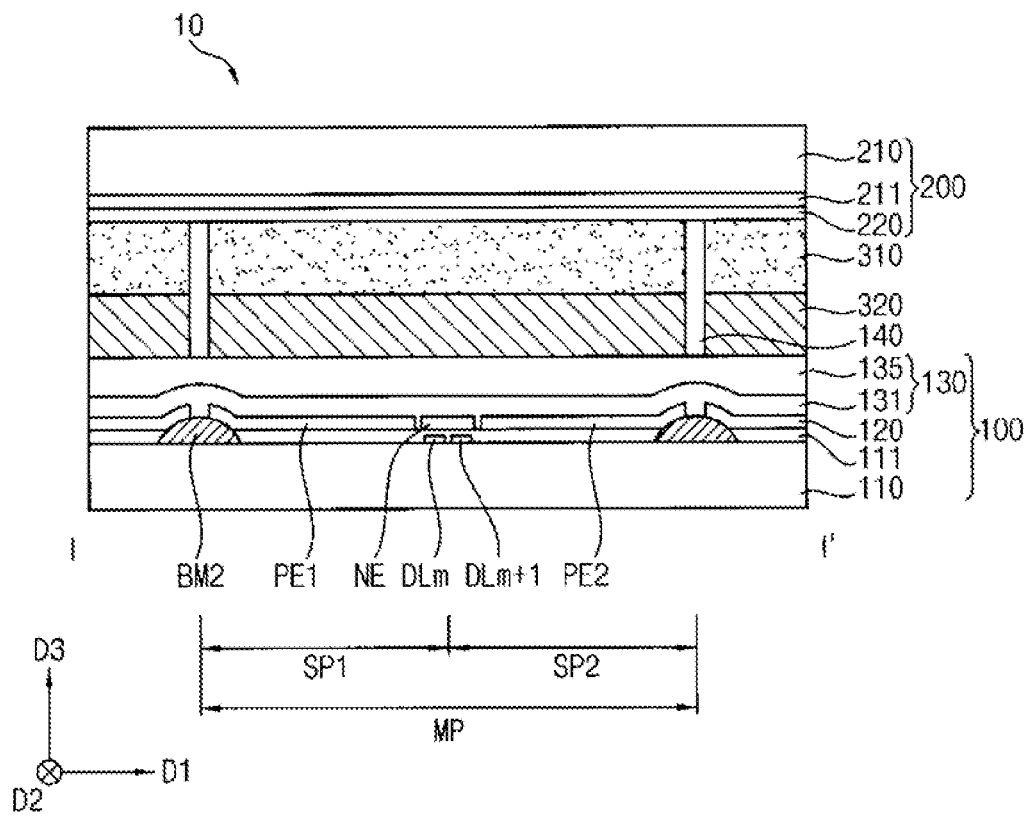
FIG. 2 is a cross-sectional view taken along a line I-I' of FIG. 1A.

FIGS. 1A and 1B are plan views illustrating an electrowetting display device according to an exemplary embodiment of the present invention. FIG. 2 is a cross-sectional view taken along a line I-I' of FIG. 1A.

FIG. 1A is a plan view illustrating a main pixel including plural pixel electrodes and a common notch electrode. FIG. 1B is a plan view illustrating a switching element, gate lines, and data lines that are formed on a first base substrate.

Referring to FIGS. 1A, 1B, and 2, an electrowetting display device 10 according to an exemplary embodiment of the present invention includes a first substrate 100, a second substrate 200 opposite to the first substrate 100, a conductive fluid 310 disposed between the first and second substrates 100 and 200 and a non-conductive fluid 320 disposed between the first and second substrates 100 and 200.

The first substrate 100 includes a first base substrate 110, a first electrode layer 120, a hydrophobic insulation layer 130 and a partition wall 140.

The first base substrate 110 may be optically transparent and electrically conductive.

The first electrode layer 120 is formed on the first base substrate 110. The first electrode layer 120 may include a transparent conductive material such as an indium tin oxide (ITO) or an indium zinc oxide (IZO). The ITO may be formed by a compound (e.g. In2O3, SnO2) of indium and a tin oxide. The ITO may be mainly formed in a sputtering manner.

The first electrode layer 120 forms a main pixel MP configured by plural pixel electrodes PE1 and PE2 and a common notch electrode NE. The main pixel MP and the partition wall 140 cross each other to define a pixel area. A plurality of main pixels MPs is formed on the first electrode layer 120. For convenience of description, one main pixel MP will be described herein.

The plural pixel electrodes PE1 and PE2 are spaced apart from each other. The common notch electrode NE is formed between the plural pixel electrodes PE1 and PE2. The pixel electrodes PE1 and PE2 and the common notch electrode NE may have a uniform thickness within the same layer.

The main pixel MP includes plural sub-pixels SP1 and SP2 divided by the common notch electrode NE. The common notch electrode NE is formed on a central area of the main pixel MP. Each of the sub-pixels SP1 and SP2 includes one pixel electrode. The plural pixel electrodes PE1 and PE2 may be equal in size to each other. Moreover, the plural pixel electrodes PE1 and PE2 may have the same shape as each other. The first and second pixel electrodes PE1 and PE2 may be reflection electrodes reflecting light.

For example, the main pixel MP may include a first sub-pixel SP1 positioned at a left side of the MP and a second sub-pixel SP2 positioned at a right side of the MP. The main pixel MP includes a first pixel electrode PE1, a second pixel electrode PE2 and a common notch electrode NE. The first sub-pixel SP1 includes the first pixel electrode PE1 and a left side of the common electrode NE, and the second sub-pixel SP2 includes the second pixel electrode PE2 and a right side of the common notch electrode NE. A left portion of the common notch electrode NE and a right portion of the common notch electrode NE may be reversed to the different sub-pixel with respect to a center portion of the common notch electrode NE. A size of the common notch electrode NE may be about 30% or less of the first and second pixel electrodes PE1 and PE2.

A first voltage may be applied to the common notch electrode NE. A second voltage may be applied to the first pixel electrode PE1. A third voltage may be applied to the second pixel electrodes PE2. The first, second, and third voltages may each differ from one another. The common notch electrode NE delivers a common voltage Vcom from an external device to the main pixel MP. The conductive fluid 310 and the non-conductive fluid 320, which are filled with the main pixel MP defining a unit pixel area, may spread or gather to display an image in response to a voltage difference between the data voltage applied to the first pixel electrode PE1 and the common voltage Vcom applied to the common notch electrode NE as well as the voltage difference between the data voltage applied to the second pixel electrode PE2 and the common voltage Vcom applied to the common notch electrode NE.

The main pixel MP defines a pixel area through the partition wall 140 and the sub-pixels SP1 and SP2 define a pixel area through the common notch electrode NE without the partition wall 140. For example, according to an exemplary embodiment of the present invention, the partition wall disposed between the pixels is removed on at least two sub-pixels SP1 and SP2 to realize plural sub-pixels SP1 and SP2 by using one main pixel MP.

The hydrophobic insulation layer 130 is formed on the first electrode layer 120. The hydrophobic insulation layer 130 includes an organic layer 131 and a hydrophobic layer 135.

The organic layer 131 is formed on the first electrode layer 120.

The hydrophobic layer 135 is formed on the organic layer 131, and wettability thereof is controlled in accordance with an electric signal applied to the first and second pixel electrodes PE1 and PE2. The hydrophobic layer 135 has a hydrophobic property. The term "hydrophobic" may indicate that a surface of a fluid is not dissolved in water or that water is repelled at the surface of the fluid. The term "wettability" may indicate that a surface tension of a fluid is decreased and fluid is spread thereupon. For example, when a predetermined voltage is applied to the first and second pixel electrodes PE1 and PE2, a property of the hydrophobic layer 135 is changed from being hydrophobic to being hydrophilic. The term "hydrophilic" may indicate a tendency to interact with water molecules. Thus, in the electrowetting display device, a transparent electrolyte (for example, a conductive fluid 310) causes an opaque oil (for example, a non-conductive fluid 320) to move on the hydrophobic insulation layer 135 thereby controlling transmissivity of light. For example, the electrowetting display device expresses a gray scale in accordance with a voltage level applied thereto.

The partition wall 140 is formed surrounding the first and second pixel electrodes PE1 and PE2 and the common notch electrode NE on the hydrophobic insulation layer 130. For example, the partition wall 140 is disposed on the hydrophobic insulation layer 130 and defines the main pixel MP. The partition wall 140 has a closed loop shape surrounding the main pixel MP. The partition wall 140 is formed between the first substrate 100 and the second substrate 200. The partition wall 140 may play a role of receiving the conductive fluid 310 and the non-conductive fluid 320 and play a role of a spacer maintaining a cell gap between the first substrate 100 and the second substrate 200. The partition wall 140 may be formed having a height which partially closes the main pixel MP without contacting the second substrate 200.

The first substrate 100 may further include a light-blocking layer BM, a switching element SW, plural data lines DLm and DLm+1, plural gate lines GLn and GLn+1 and a passivation film 111. As used herein, 'm' and 'n' are natural numbers.

The light-blocking layer BM is formed on the first base substrate 110 in correspondence with the partition wall 140. The light-blocking layer BM may include an organic material. The light-blocking layer BM includes a first light-blocking layer BM1 and a second light-blocking layer BM2.

The first light-blocking layer BM1 is extended in a first direction D1 and has a first width w1 substantially equal to a width of the partition wall 140. For example, the first light-blocking layer BM1 overlaps the partition wall 140 and is located on a boundary area defining the main pixel MP.

The second light-blocking layer BM2 is extended in a second direction D1 substantially perpendicular to the first direction D1. The second light-blocking layer BM2 may have a second width w2 that is greater than a width of the partition wall 140. For example, the second light-blocking layer BM2 extends beyond an area of the partition wall 440 to invade a portion of the sub-pixel SP. The second light-blocking layer BM2 is spaced apart from the common notch electrode NE.

Motion directions of the conductive fluid 310 and the non-conductive fluid 320 may be set in accordance with a position of the second light-blocking layer BM2. For example, when the second light-blocking layer BM2 is positioned at two side areas of the main pixel MP, the non-conductive fluid 320 belonging to the first sub-pixel SP1 moves, along the first direction D1, from an area that the second light-blocking layer 13M2 of a left side of the main pixel MP has extended to toward the common notch electrode NE. The non-conductive fluid 320 belonging to the second sub-pixel SP2 moves, along the first direction D1, from an area that the second light-blocking layer BM2 of a right side of the main pixel MP has extended to toward the common notch electrode NE.

A thickness of the second light-blocking layer BM2 is gradually increases close to the partition wall 140. For example, a thickness of the hydrophobic insulation layer 130 formed on the second light-blocking layer BM2 is decreased on an upper portion area of the second light-blocking layer BM2. For example, a thickness of the hydrophobic insulation layer 130 is decreased at an edge area of the main pixel MP spaced apart from the common notch electrode NE.

For example, when the second light-blocking layer BM2 is extended in the second direction D2 and is positioned at two side areas of the main pixel MP, a center portion of the second light-blocking layer BM2 is formed having a convex shape when viewed from a cross-sectional view. Moreover, in an upper area of the second light-blocking layer BM2, a center portion of the hydrophobic layer 135 is formed having a concave shape and a decreased thickness. As a result, a thickness of the first substrate 100 is uniform, and a thickness of the hydrophobic layer 135 is decreased by the second light-blocking layer BM2.

As such, there is a difference between the thickness of the second light-blocking layer BM2 at a lower portion of the partition wall and the thickness of the second light-blocking layer BM2 at other points. Light leakage may therefore be reduced or prevented and a threshold voltage Vth-on may be decreased due to the relative thinness of the hydrophobic layer 135. The threshold voltage Vth-on may be a minimum voltage level for flowing the conductive fluid 310 and the non-conductive fluid 320.

The switching element SW is formed on the first base substrate 110 and may provide the electric signal to each of the pixel electrodes PE1 and PE2. The switching element SW may be a thin-film transistor (TFT) which is turned-on in response to a gate signal.

The plural data lines DLm and DLm+1 and the plural gate lines GLn and GLn+1 are formed on the first base substrate 110. The data lines DLm and DLm+1 may be overlapped with the common notch electrode NE and may be adjacent to each other.

For example, the gate lines GLn and GLn+1 may be extended in a first direction D1. A second gate line GLn+1 is spaced apart from a first gate line GLn in a second direction D2 substantially perpendicular to a first direction D1. The data lines DLm and DLm+1 are extended in the second direction D2 of the first base substrate 110 and are adjacent to each other along the first direction D1. The data lines DLm and DLm+1 may be overlapped with the common notch electrode NE and may be adjacent to each other. For example, the gate lines GLn and GLn+1 are disposed below the partition wall 140, are extended in the first direction D1, and are positioned at a boundary line of the main pixel MP. The data lines DLm and DLm+1 are disposed below the common notch electrode NE, are extended in the second direction D2, and are positioned at a boundary line of the sub-pixels SP1 and SP2. The data lines DLm and DLm+1 are disposed between the first pixel electrode PE1 and the second pixel electrode PE2 that are formed on two sides of the common notch electrode NE with respect to the common notch electrode NE.

The switching element SW is electrically connected to the gate lines GLn and GLn+1 and the data lines DLm and DLm+1, respectively. The switching element SW may include a gate electrode GE, a channel layer (not shown) disposed on the gate electrode GE, a source electrode SE disposed on the channel layer and a drain electrode DE disposed on the channel layer. For example, the gate electrode GE of the switching element SW is connected to a first gate line GLn, the source electrode SE is connected to a first data line DLm, and a drain electrode DE is spaced apart from the source electrode SE.

The passivation film 111 is formed on the switching element SW, the gate lines GLn and GLn+1 and the data lines DLm and DLm+1. The passivation film 111 may cover the gate lines GLn and GLn+1, the data lines DLm and DLm+1, and the switching element SW.

Contact holes CH are formed through the plural pixel electrodes PE1 and PE2, which are electrically connected to the switching element SW, respectively. The first and second pixel electrodes PE1 and PE2 are electrically connected to the drain electrode DE of the switching element SW through the contact hole CH opening the passivation film 111. The non-conductive fluid 320 is excluded from the contact hole CH and a distance interval 'd' between the common notch electrode NE and the contact hole CH may be about 20 μm or less.

The second substrate 200 may include a second base substrate 210, a color filter layer 211 and a second electrode layer 220.

The second base substrate 210 may be optically transparent and electrically conductive.

The color filter layer 211 is formed on the second base substrate 210. According to an exemplary embodiment of the present invention, the color filter layer 211 is formed on the second substrate 200. Alternatively, the color filter layer 211 may be formed on the first substrate 100.

The second electrode layer 220 is formed on the color filter layer 211. The second electrode layer 220 may be formed including a material that is both optically transparent and electrically conductive, for example, the material may be indium tin oxide (ITO) or indium zinc oxide (IZO). A voltage applied to the common notch electrode NE may be identical to a voltage applied to the second electrode layer 220. For example, a common voltage Vcom may be applied to the common notch electrode NE and the second electrode layer 220.

The conductive fluid 310 includes a transparent electrolyte, and the non-conductive fluid 320 includes a non-polar oil having an opaque or semi-opaque color. The conductive fluid 310 may include pure water and a relatively small amount of electrolyte as a polarity fluid, and the non-conductive fluid 320 may have a colored oil, such as an oil colored black. The first substrate 100 and the second substrate 200 are combined with each other, so that the conductive fluid 310 and the non-conductive fluid 320 may be sealed within the main pixel MP.

The non-conductive fluid 320 is colored as an opaque color and may flow in accordance with an electric field applied thereto. The non-conductive fluid 320 may play a role as a shutter blocking or opening light. The non-conductive fluid 320 may be an opaquely colored oil. The oil may include various oils such as a red colored oil, a blue colored oil, and a green colored oil.

The non-conductive fluid 320 (hereinafter, an opaque oil) is jetted into the main pixel MP. The main pixel may be defined as a predetermined volume by the hydrophobic layer 135 as a bottom portion and surrounded by the partition wall 140

According to an exemplary embodiment of the present invention, the opaque oil 320 may be jetted to have a volume greater than that of the main pixel MP not the first and second sub-pixel electrodes SP1 and SP2, so that an electrowetting display device may realize a high definition image.

Moreover, a partition wall between the first and second sub-pixels SP1 and SP2 is removed and the opaque oil 320 is permitted to gather into a single area within the first and second sub-pixels SP1 and SP2, so that a non-transmitting area of the pixel may be reduced and a transmissivity of the pixel increased.

FIGS. 3 to 7 are cross-sectional views illustrating an operation of the electrowetting display device of FIG. 2.

A gray scale expression of the electrowetting display device 10 may be realized by a voltage applied to the first and second pixel electrodes PE1 and PE2. In an off state in which an electric field is not applied to the first and second pixel electrodes PE1 and PE2, the opaque oil 320 covers a whole of the hydrophobic insulation layer 130. A size of the opaque oil 320 covering the hydrophobic insulation layer 130 may be varied in accordance with a voltage level applied to the first and second pixel electrodes PE1 and PE2. For example, when a voltage level applied to the first and second pixel electrodes PE1 and PE2 is controlled, as shown in FIGS. 3 to 7, a size of the hydrophobic insulation layer 130 covered by the opaque oil 320 may be controlled, and thus a desired gray scale may be expressed. A higher voltage level applied to the first and second pixel electrodes PE1 and PE2 causes a volume of the opaque oil 320 to decrease and a volume of the opaque oil 320 positioned on the common notch electrode NE to increase. Conversely, a lower voltage level applied to the first and second pixel electrodes PE1 and PE2 causes the volume of the opaque oil 320 to increase and a volume of the opaque oil 320 positioned on the common notch electrode NE to decrease.

Figure 3:
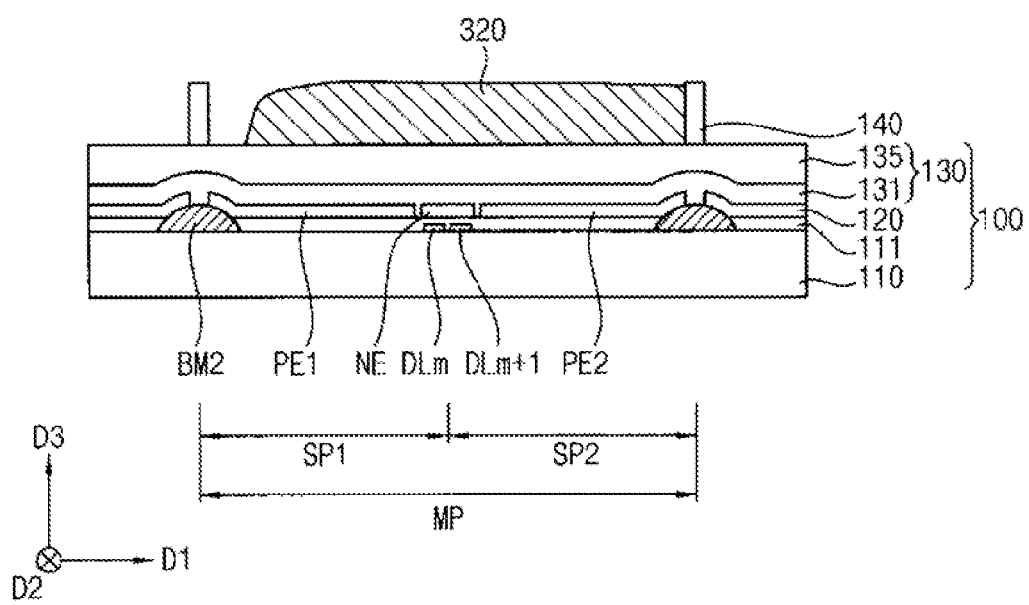
FIGS. 3 to 7 are cross-sectional views illustrating an operation of the electrowetting display device of FIG. 2.

Referring to FIG. 3, when a predetermined threshold voltage Vth-on is applied to the first pixel electrode PE1, an opaque oil 320 is started moving from an area of the second light-blocking layer BM2 along a first direction D1. A common electrode voltage Vcom of zero voltage is applied to the common notch electrode NE and the second electrode layer 220. Thus, the second light-blocking layer BM2 of the hydrophobic insulation layer 130 having a wettability property becomes hydrophilic, so that the second light-blocking layer BM2 pulls the conductive fluid 310 (hereinafter, a transparent electrolyte). The transparent electrolyte 310 contacts the hydrophobic insulation layer 130 and pushes the opaque oil 320 into a center portion of the main pixel MP. For example, when the second light-blocking layer BM2 is positioned at two side areas of the main pixel MP, the opaque oil 320 is started moving from an area where the second light-blocking layer BM2 is extended into to the common notch electrode NE.

Figure 4:
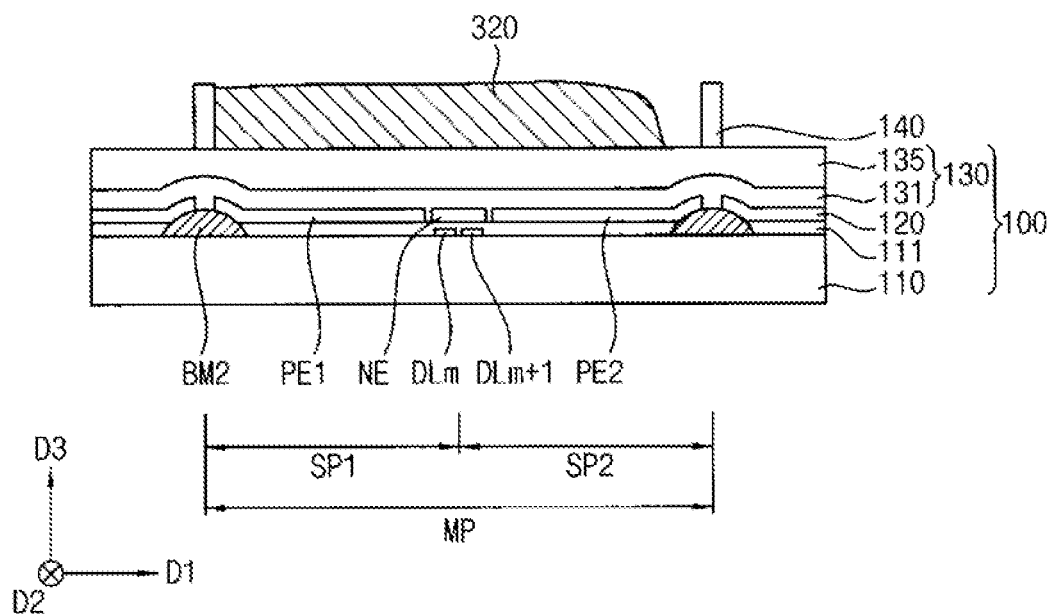

Referring to FIG. 4, when a predetermined threshold voltage Vth-on is applied to the second pixel electrode PE2, the opaque oil 320 is started moving from an area of the second light-blocking layer BM2 along the first direction D1. For example, when the second light-blocking layer BM2 is positioned at two side areas of the main pixel MP, the opaque oil 320 moves from an area that the second light-blocking layer BM2 of a second pixel electrode PE2 is extended into to the main pixel MP toward the common notch electrode NE.

Figure 5:
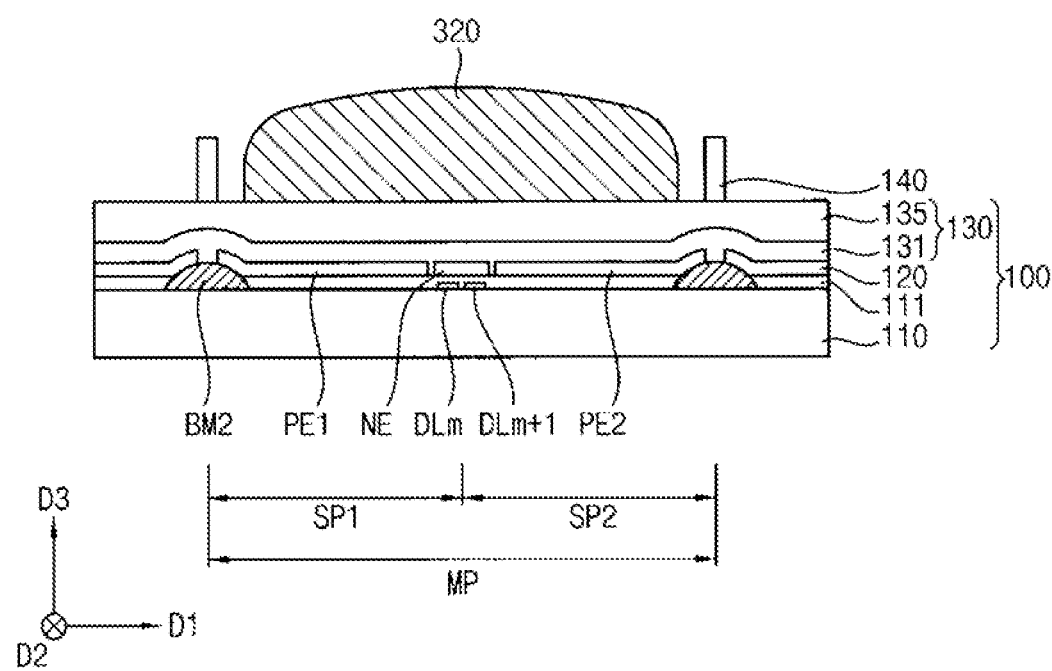

Referring to FIG. 5, when a predetermined threshold voltage Vth-on is applied to the first pixel electrode PE1 and the second pixel electrode PE2, the opaque oil 320 is started moving from an area of the second light-blocking layer BM2 along the first direction D1. For example, when the second light-blocking layer BM2 is positioned at two side areas of the main pixel MP, the opaque oil 320 is started moving from an area that the second light-blocking layer BM2 is extended into to the main pixel MP at two side areas of the main pixel MP toward the common notch electrode NE.

Figure 6:
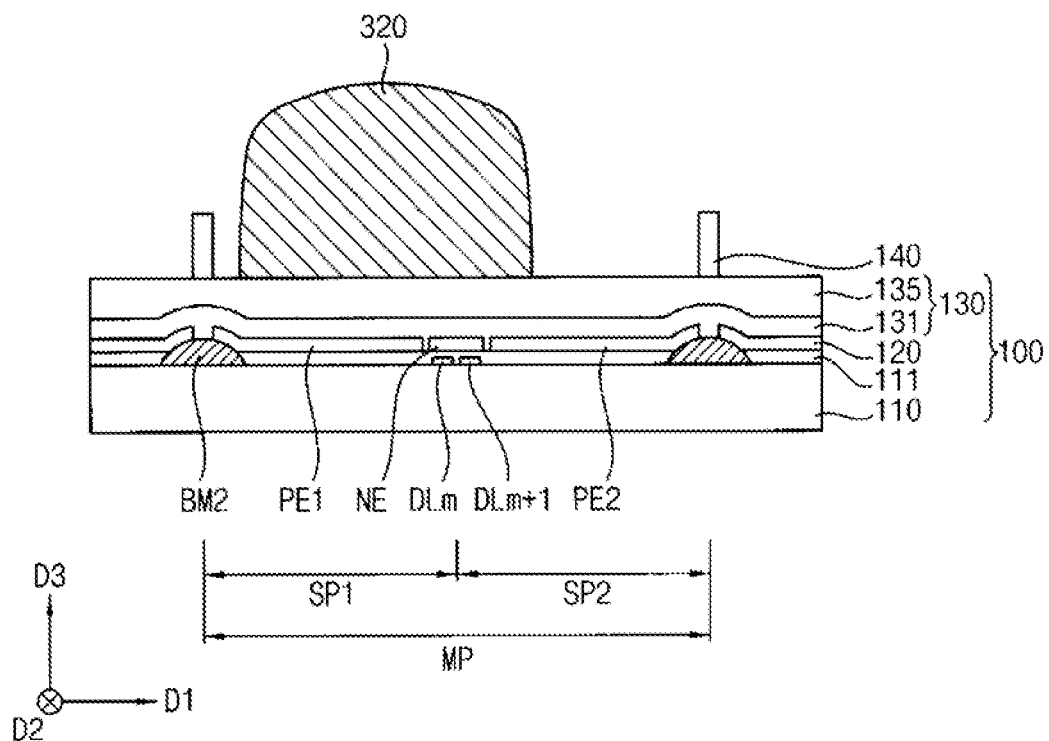

Referring to FIG. 6, when a high voltage is applied to the second pixel electrode PE2, the opaque oil 320 is pushed out to an area of the first pixel electrode PE1 and the common notch electrode NE. A common electrode voltage Vcom of zero voltage is applied to the common notch electrode NE and the second electrode layer 220. Thus, the second pixel electrode PE2 of the hydrophobic insulation layer 130 having a wettability property is made to be hydrophilic, so that the second pixel electrode PE2 pulls the transparent electrolyte 310. The transparent electrolyte 310 contacts with the hydrophobic insulation layer 130 and pushes the opaque oil 320 into an area of the common notch electrode NE. For example, when the second pixel electrode PE2 is positioned at a right portion of the common notch electrode NE, the opaque oil 320 is positioned at the first pixel electrode PE1 and the common notch electrode NE and exposes the second pixel electrode PE2. A transmissivity of the second sub-pixel SP2 is accordingly maximized. Moreover, a transmissivity of the main pixel MP is about ½.

Figure 7:
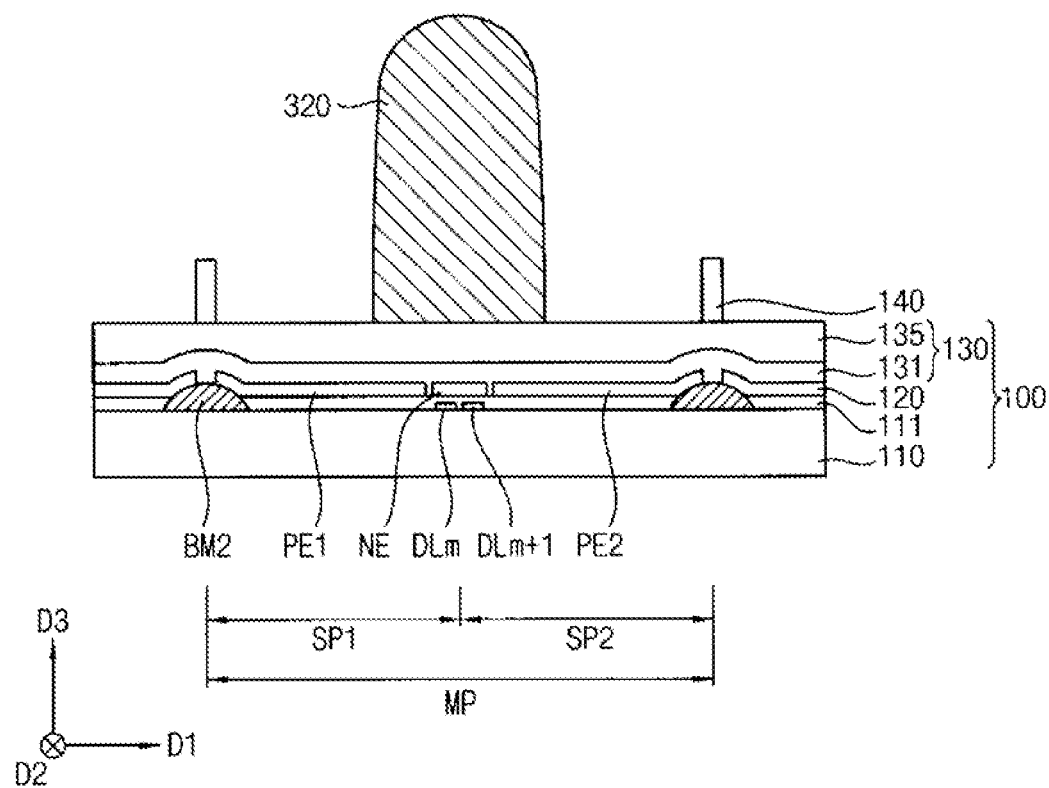

Referring to FIG. 7, when a high voltage is applied to the first pixel electrode PE1 and the second pixel electrode PE2, the opaque oil 320 is pushed out to an area of the common notch electrode NE. Thus, the first and second pixel electrodes PE1 and PE2 of the hydrophobic insulation layer 130 having a wettability property is varied to be hydrophilic, so that the first and second pixel electrodes PE1 and PE2 pull the transparent electrolyte 310. The transparent electrolyte 310 contacts the hydrophobic insulation layer 130 and the transparent electrolyte 310 pushes the opaque oil 320 into an area of the common notch electrode NE. For example, when the first and second pixel electrodes PE1 and PE2 are positioned at two sides of the common notch electrode NE, the opaque oil 320 is positioned at the common notch electrode NE and exposes the first and second pixel electrodes PE1 and PE2. A transmissivity of the first and second sub-pixels SP1 and SP2 is maximized. Moreover, a transmissivity of the main pixel MP is maximized.

According to the above described method, a surface size of the opaque oil 320 is varied in response to a voltage difference between the first and second pixel electrodes PE1 and PE2 and the common notch electrode NE. Since the surface size of the opaque oil 320 is varied, amounts of reflected light and transmitted light are controlled to display an image having various gray scale levels.

Figure 8:
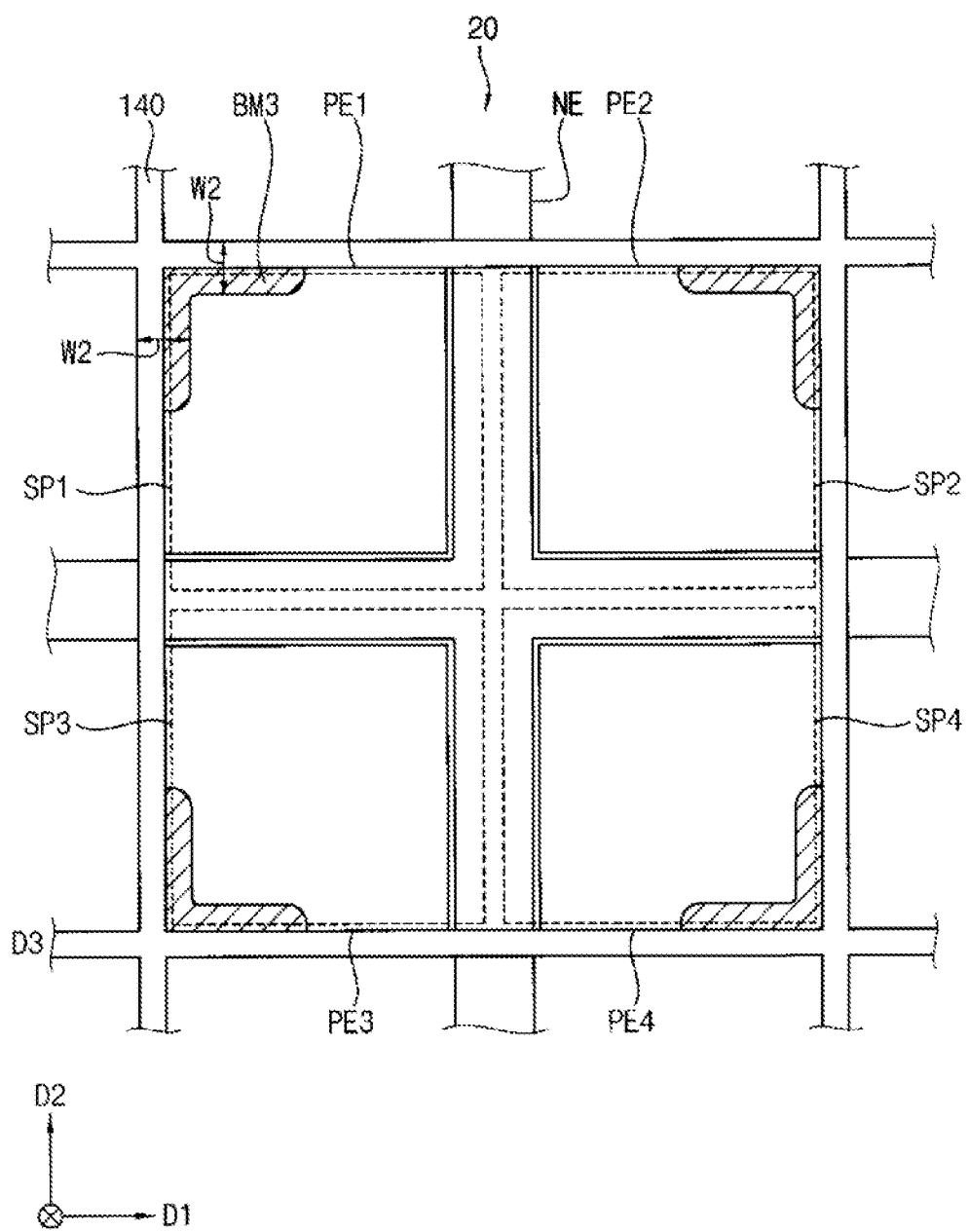
FIG. 8 is a plan view illustrating an electrowetting display device according to an exemplary embodiment of the present invention.

FIG. 8 is a plan view illustrating an electrowetting display device according to an exemplary embodiment of the present invention.

In FIGS. 1A to 2, a main pixel MP configured by two sub-pixels SP1 and SP2 is described to realize an electrowetting display device. Alternatively, as shown in FIG. 8, an electrowetting display device may be realized, which has a main pixel MP configured by four sub-pixels SP1, SP2, SP3 and SP4. According to an exemplary embodiment of the present invention, the display device may be substantially the same as the display device described with reference to FIGS. 1A to 2 except for shapes of a common notch electrode NE and a third light-blocking layer BM3 according to a disposing of four sub-pixels SP1, SP2, SP3 and SP4, and thus any repetitive detailed explanation may be omitted.

Referring to FIG. 8, an electrowetting display device 20 according to an exemplary embodiment of the present invention includes a common notch electrode NE formed between four pixel electrodes PE1, PE2, PE3 and PE4 and a third light-blocking layer BM3 formed at an edge area of the sub-pixels SP1, SP2, SP3 and SP4. The common notch electrode NE has a cross shape. The third light-blocking layer BM3 is spaced apart from the common notch electrode NE.

The main pixel MP may include a first sub-pixel SP1, a second sub-pixel SP2, a third sub-pixel SP3, and a fourth sub-pixel SP4. Each of the first to fourth sub-pixels includes one pixel electrode PE1, PE2, PE3 and PE4. The common notch electrode NE is formed at a center area of the main pixel MP. The common notch electrode NE is extended along a space area between the pixel electrode PET, PE2, PE3, and PE4 and contacts with each side of the main pixel MP. For example, the common notch electrode NE has a cross shape.

The third light-blocking layer BM3 is respectively extended in a first direction D1 and a second direction D2 substantially perpendicular to the first direction D1. The third light-blocking layer BM3 is formed having a second width w2 greater than a width of the partition wall 140. The third light-blocking layer BM3 is formed at corner areas of the sub-pixels SP1, SP2, SP3, and SP4, and the third light-blocking layer BM3 is spaced apart from the common notch electrode NE and a maximum interval is achieved. Shapes of the common notch electrode NE and the third light-blocking layer BM3 may be modified in accordance with a required configuration.

Figure 9:
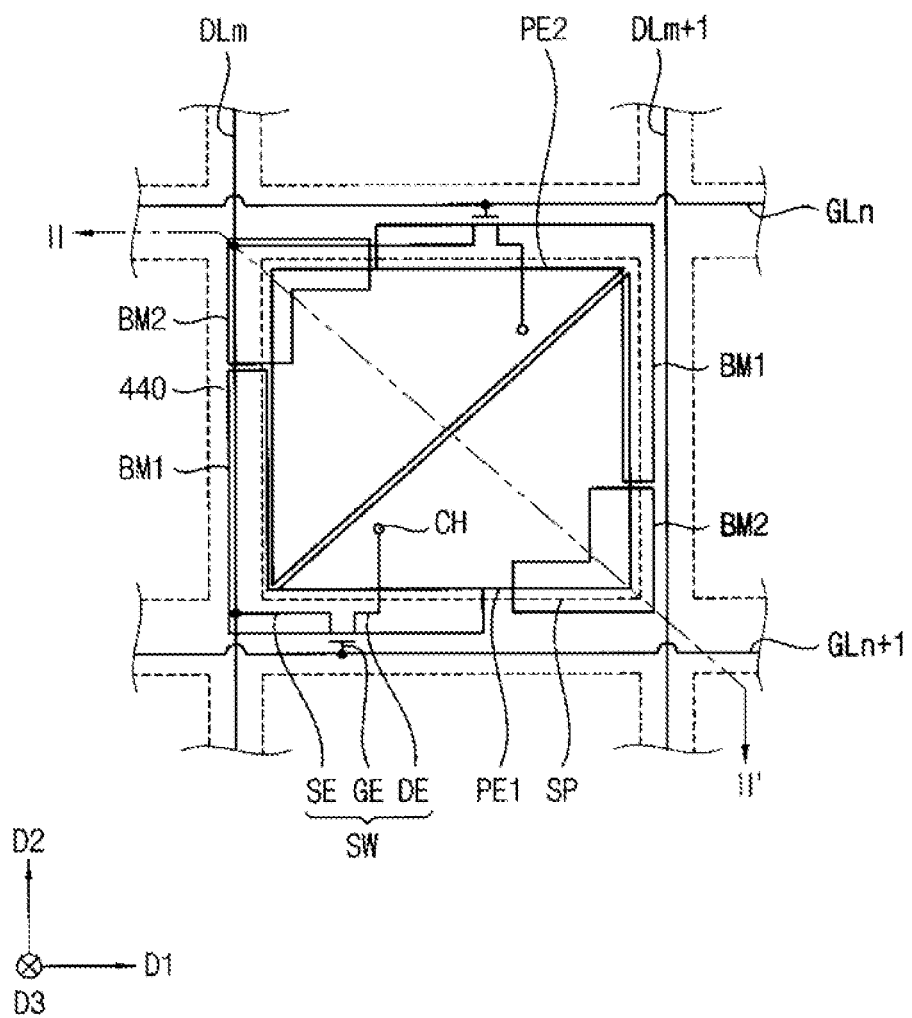
FIG. 9 is a plan view illustrating an electrowetting display device according to an exemplary embodiment of the present invention.
Figure 10:
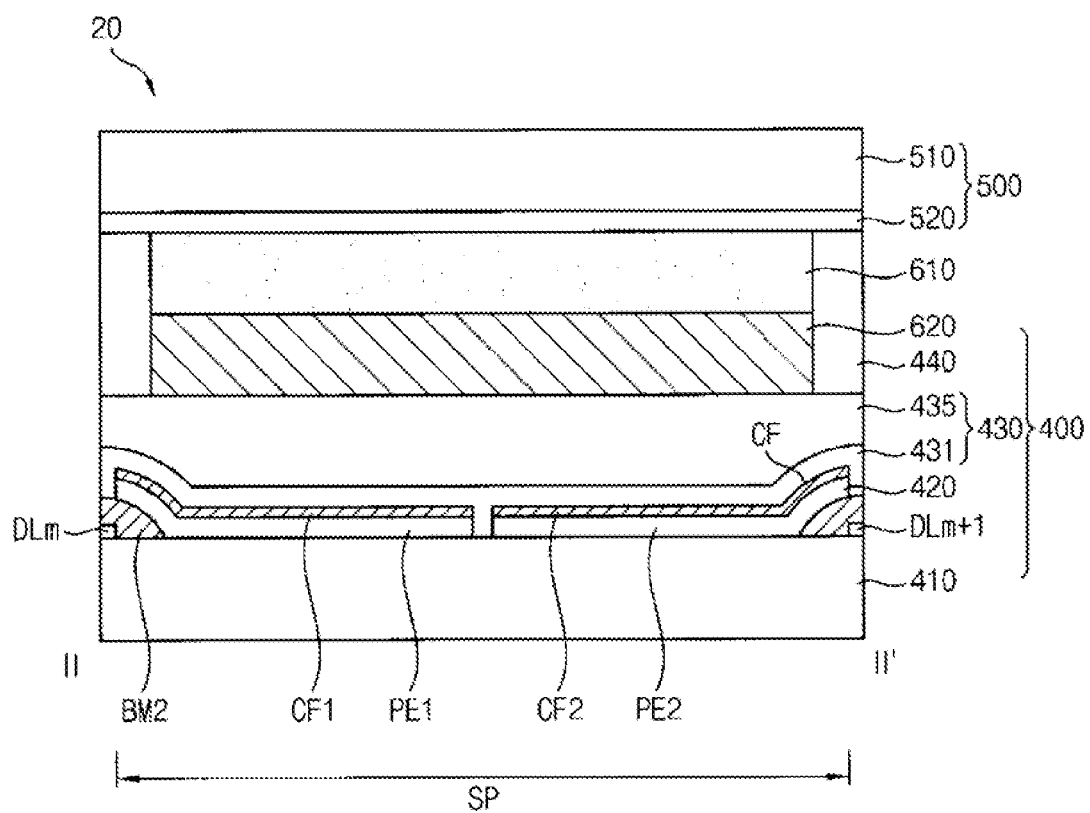
FIG. 10 is a cross-sectional view taken along a line II-II' of FIG. 9.

FIG. 9 is a plan view illustrating an electrowetting display device according to an exemplary embodiment of the present invention. FIG. 10 is a cross-sectional view taken along a line II-II' of FIG. 9.

Referring to FIGS. 9 and 10, an electrowetting display device 20 according to an exemplary embodiment of the present invention includes a first substrate 400, a second substrate 500 opposite to the first substrate 400, a conductive fluid 610, and a non-conductive fluid 620. The conductive fluid 610 and the non-conductive fluid 620 are disposed between the first and second substrate 400 and 500.

The first substrate 400 includes a first base substrate 410, a first electrode layer 420, a color filter layer CF, a hydrophobic insulation layer 430 and a partition wall 440.

The first base substrate 410 may be optically transparent and electrically conductive.

The first electrode layer 420 is formed on the first base substrate 410. The first electrode layer 420 may include a material that is both transparent and conductive such as an indium tin oxide (ITO) or an indium zinc oxide (IZO). The ITO may be formed by a compound (for example, In2O3, SnO2) of indium and a tin oxide. The ITO may be mainly formed in a sputtering manner.

The first electrode layer 420 includes a first pixel electrode PE1 and a second pixel electrode PE2. The first and second pixel electrodes P1 and PE2 disposed between adjacent partition walls 440 form one sub-pixel SP, and plural sub-pixels SP adjacent to each other form one main pixel MP. Plural sub-pixels SP are formed on the first electrode layer 420. For convenience of description, one sub-pixel SP will be described. However, it is to be understood that the remaining subpixels may be similarly or identically configured.

The first and second pixel electrodes PE1 and PE2 may be spaced apart from each other, and may be formed having a uniform thickness within the same layer. The first pixel electrode PE1 has the same size as the second pixel electrode PE2, and a shape of the first pixel electrode PE1 is the same as a shape of the second pixel electrode PE2. The first and second pixel electrode PE1 and PE2 may form a reflection electrode reflecting light. The first and second pixel electrodes PE1 and PE2 face each other with respect to a diagonal line of the sub-pixel SP, however all exemplary embodiments of the present invention are not limited to this configuration. The numbers of the first and second pixel electrodes PE1 and PE2 may be varied in accordance with a required configuration, and shapes of the first and second pixel electrodes PE1 and PE2 may be modified in accordance with a required configuration.

The color filter layer CF may be formed on the first electrode layer 420. The color filter layer CF may include a first color filter CF1 formed on an area corresponding to the first pixel electrode PE1 and a second color filter CF2 formed on an area corresponding to the second pixel electrode PE2. The color filter layer CF is formed having the same number and the same shape as the first and second pixel electrodes PE1 and PE2, and each of the color filters CF1 and CF2 are of different colors from each other. The color filter layer CF is formed on the first electrode layer 420, however all exemplary embodiments of the present invention are not limited to this configuration. For example, the color filter layer CF may be formed on one of the first and second substrates 400 and 500. Alternatively, the color filter layer CF may be formed on another layer that is not the first electrode layer 420.

The hydrophobic insulation layer 430 is formed on the color filter layer CF. The hydrophobic insulation layer 430 includes an organic layer 431 and a hydrophobic layer 435. The hydrophobic insulation layer 430 may be substantially the same as the hydrophobic insulation layer 430 described with reference to FIGS. 1A to 2, and thus any repetitive detailed explanation may be omitted.

The partition wall 440 is formed on the hydrophobic insulation layer 430 and may surround the pixel electrodes PE1 and PE2. For example, the partition wall 440 is formed on the hydrophobic insulation layer 430 and may define the sub-pixel SP. The partition wall 440 has a closed loop shape surrounding the sub-pixel SP. The partition wall 440 is formed between the first substrate 400 and the second substrate 500. The partition wall 440 may receive the conductive fluid 610 and the non-conductive fluid 620 and act as a spacer maintaining a cell gap between the first substrate 400 and the second substrate 500. The partition wall 440 may be formed having a height which partially encloses the sub-pixel SP without contacting the second substrate 500.

The first substrate 400 may further include a light-blocking layer BM, a switching element SW, plural data lines DLm and DLm+1, plural gate lines GLn and GLn+1, and a passivation film (not shown).

The light-blocking layer BM is formed on the first base substrate 410 in correspondence with the partition wall 440. The light-blocking layer BM may include an organic material. The light-blocking layer BM includes a first light-blocking layer BM1 and a second light-blocking layer BM2. The first light-blocking layer BM1 is overlapped with the partition wall 440 and has a predetermined thickness. The second light-blocking layer BM2 is formed having a relatively large width with respect to a width of the partition wall 440. A width of the second light-blocking layer BM2 is gradually increased in a region close to the partition wall 440. As such, a thickness of the hydrophobic insulation layer 430 formed on the second light-blocking layer BM2 is decreased on an upper portion area of the second light-blocking layer BM2. For example, a thickness of the hydrophobic insulation layer 430 is decreased at an edge area of the main pixel MP spaced apart from the common notch electrode NE.

For example, when the second light-blocking layer BM2 is positioned at two side areas of the sub-pixel SP, a center portion of the second light-blocking layer BM2 is formed having a convex shape when viewed from a cross-sectional view. Moreover, in an upper area of the second light-blocking layer BM2, a center portion of the hydrophobic layer 435 is formed having a concave shape and a decreased thickness. As a result, a thickness of the first substrate 400 is uniform, and a thickness of the hydrophobic layer 435 is decreased by the second light-blocking layer BM2.

As such, a thickness difference of the second light-blocking layer BM2 is generated at a lower portion of the partition wall, so that a light leakage may be reduced or prevented and a threshold voltage Vth-on may be decreased due to a thinness of the hydrophobic layer 435. The threshold voltage Vth-on may be a minimum voltage level for flowing of the conductive fluid 610 and the non-conductive fluid 620.

The switching element SW is formed on the first base substrate 410 and provides the electric signal to each of the pixel electrodes PE1 and PE2. The switching element SW may be a thin-film transistor (TFT) which is turned-on in response to a gate signal.

The plural data lines DLm and DLm+1 and the plural gate lines GLn and GLn+1 are formed on the first base substrate 410. The switching elements SW corresponding to the first and second pixel electrodes PE1 and PE2 are electrically connected to one of the data lines DLm and DLm+1, and each of the switching elements SW is electrically connected to the different gate lines GLn and GLn+1. For example, the sub-pixel SP is driven by one gate line DLm and plural gate lines GLn and GLn+1.

The switching element SW may include a gate electrode GE, a channel layer (not shown) disposed on the gate electrode GE, a source electrode SE disposed on the channel layer, and a drain electrode DE disposed on the channel layer. For one example, the gate electrode GE of the switching element SW is connected to a first gate line GLn, the source electrode SE is connected to a first data line DLm, and a drain electrode DE is spaced apart from the source electrode SE. A position of the switching element SW and lengths of each of the electrodes may be varied in accordance with a required configuration.

A contact hole CH electrically connected to the switching element SW is formed through the first and second pixel electrode PE1 and PE2. The first and second pixel electrode PE1 and PE2 are electrically connected to a drain electrode DE of the switching element SW through the contact hole CH opening the passivation film. Since the non-conductive fluid 620 may remain within the contact hole CH, a distance interval between a boundary of the first and second pixel electrodes PE1 and PE2 and the contact hole CH may be minimized. Moreover, the drain electrode DE of the switching element SW connected to the contact hole CH is penetrated into a display area, so that it is preferred that the drain electrode DE of the switching element SW is connected to the pixel electrodes PE1 and PE2.

The second substrate 500 may include a second base substrate 510 and a second electrode layer 520.

The second base substrate 510 may be optically transparent and electrically conductive.

The color filter layer CF may be formed on the second base substrate 510. The color filter layer CF may be formed on the first substrate 400. Alternatively, the color filter layer CF may be formed on the second substrate 500. When the color filter layer CF is formed on the second substrate 500, light leakage due to a cell gap may be generated. Thus, the color filter layer CF is formed on the first substrate 400.

The conductive fluid 610 and the non-conductive fluid 620 may be substantially the same as the conductive fluid 610 and the non-conductive fluid 620 described with reference to FIGS. 1A to 2, and thus any repetitive detailed explanation may be omitted.

Figure 11A:
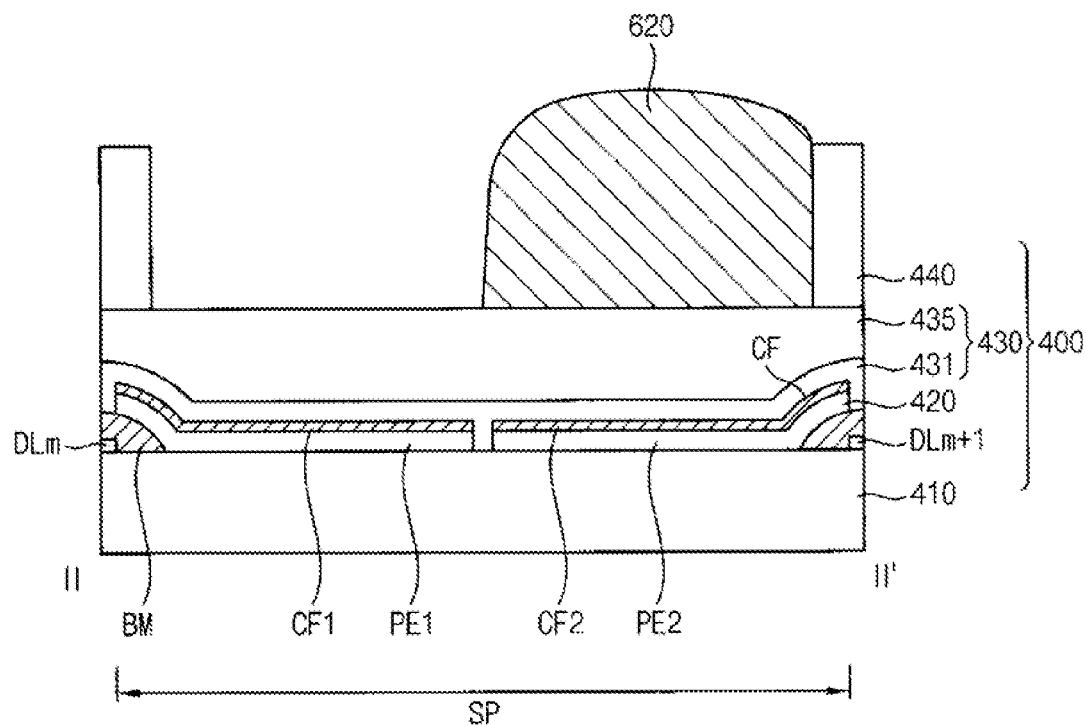

FIGS. 11A and 12B are cross-sectional views illustrating an operation of the electrowetting display device of FIG. 10.

A gray scale expression of the electrowetting display device 20 may be realized by a voltage applied to the first and second pixel electrodes PE1 and PE2. A color expression of the electrowetting display device 20 may be realized by the application of a voltage to the pixel electrode of the first and second pixel electrodes PE1 and PE2 and a color of a color filter of the corresponding pixel electrode. For example, a color of the first color filter CF1 on the first pixel electrode PE1 is displayed when a voltage is applied to the first pixel electrode PE1, and a color of the second color filter CF2 on the second pixel electrode PE2 is displayed when a voltage is applied to the second pixel electrode PE2.

Referring to FIG. 11A, when a high voltage is applied to the first pixel electrode PE1, the opaque oil 620 is pushed out from the first pixel electrode PE1 and is positioned on the second pixel electrode PE2. In this case, a common electrode voltage Vcom of zero voltage is applied to the second pixel electrode PE2 and the second electrode layer 520. Thus, the first pixel electrode PE1 of the hydrophobic insulation layer 430 having a wettability property is varied to be hydrophilic, so that the first pixel electrode PE1 pulls the transparent electrolyte 610. The transparent electrolyte 610 contacts with the hydrophobic insulation layer 430 and pushes the opaque oil 620 into an area of the second pixel electrode PE2. Therefore, light is transmitted through the transparent electrolyte 610 to display a color of the first color filter CF1, and a color of the second color filter CF2 on the second pixel electrode PE2 where the opaque oil 620 is positioned is not displayed.

Figure 11B:
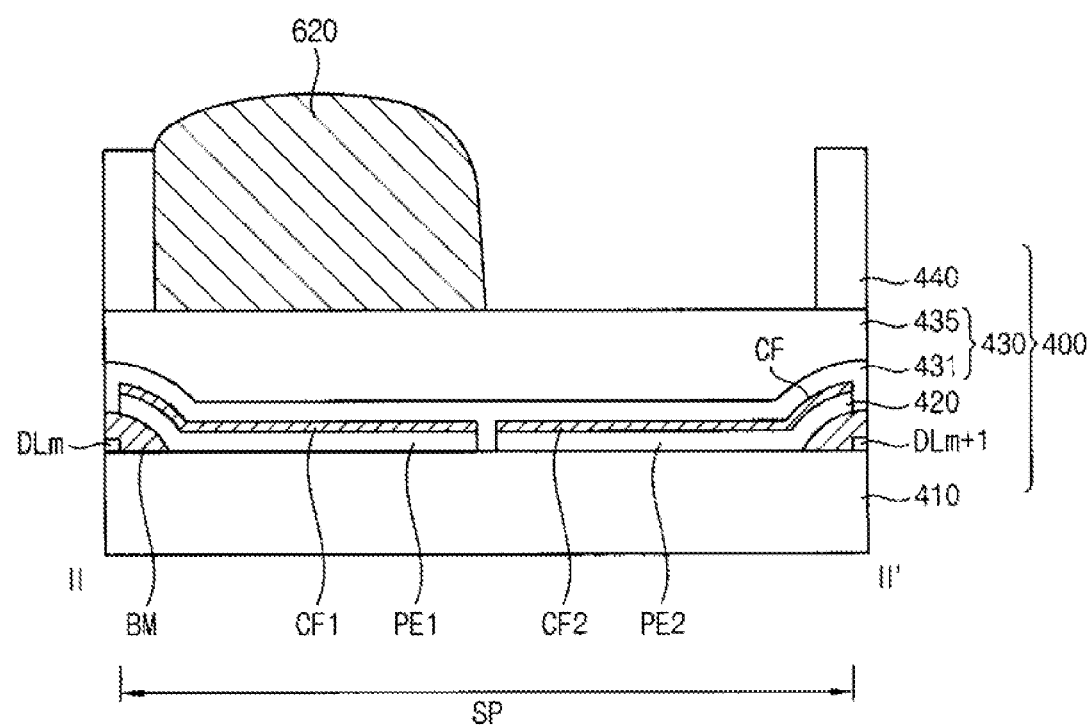

Referring to FIG. 11B, when a high voltage is applied to the second pixel electrode PE2, the opaque oil 620 is pushed out from the second pixel electrode PE2 and is positioned on the first pixel electrode PE1. In this case, a common electrode voltage Vcom of zero voltage is applied to the first pixel electrode PE1 and the second electrode layer 520. Thus, the second pixel electrode PE2 of the hydrophobic insulation layer 430 having a wettability property is varied to be hydrophilic, so that the second pixel electrode PE2 pulls the transparent electrolyte 610. The transparent electrolyte 610 contacts with the hydrophobic insulation layer 430 and pushes the opaque oil 620 into an area of the first pixel electrode PE1. Therefore, light is transmitted the transparent electrolyte 610 to display a color of the second color filter CF2, and a color of the first color filter CF1 on the first pixel electrode PE1 where the opaque oil 620 is positioned is not displayed.

According to the above, the opaque oil 620 is moved in response to a voltage different which is applied to one of the first and second pixel electrodes PE1 and PE2, and thus a color may be selectively displayed within one sub-pixel SP. Therefore, a utilizability of a non-transmitting area may be increased.

Figure 12:
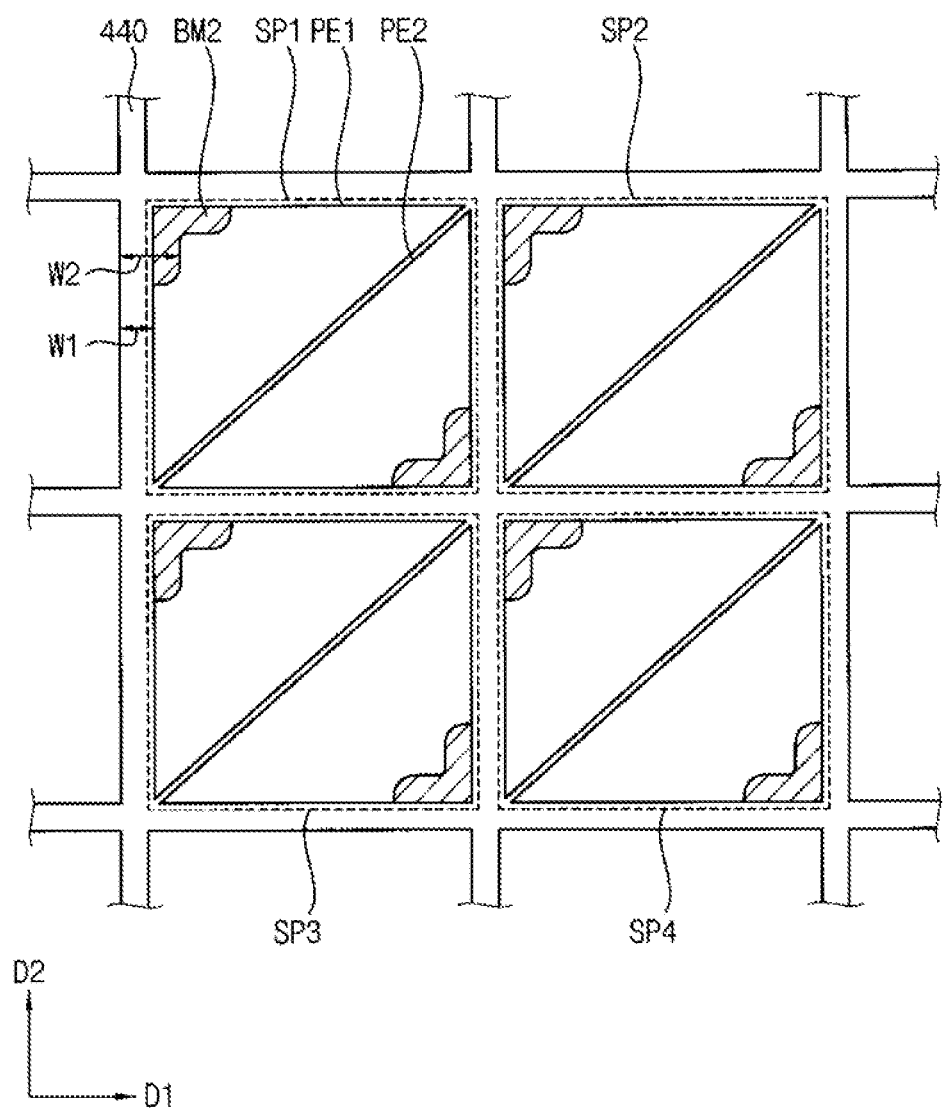
FIG. 12 is a plan view illustrating a main pixel in which plural sub-pixels of FIG. 9 are configured.
Figure 13:
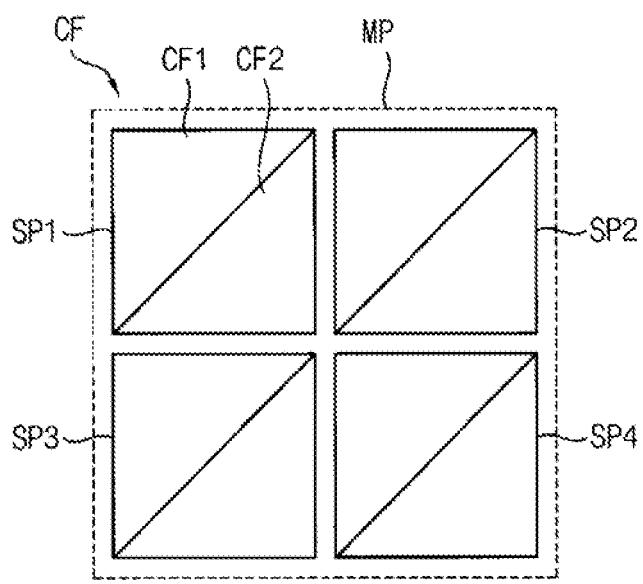
FIG. 13 is a plan view illustrating plural color filters comprising a main pixel and an operation expressing a color by the main pixel.

FIG. 12 is a plan view illustrating a main pixel in which plural sub-pixels of FIG. 9 are configured. FIG. 13 is a plan view illustrating plural color filters configuring a main pixel and an operation expressing a color by the main pixel.

Referring to FIG. 12, in an electrowetting display device according to an exemplary embodiment of the present invention, four sub-pixels SP1, SP2, SP3, and SP4 adjacent to each other form one main pixel MP. Plural main pixels MP are formed on the first electrode layer 420. For convenience of description, one main pixel MP will be described; however, it is to be understood that there may be multiple main pixels that are similar to or identical to the MP described herein.

Structures of each of the sub-pixels SP1, SP2, SP3 and SP4 included in the main pixel MP are the same. However, color filters CF1 and CF2 included in the sub-pixels SP1 SP2, SP3 and SP4 may have colors different from each other. Each of the sub-pixels SP1, SP2, SP3 and SP4 includes a first pixel electrode PE1 and a second pixel electrode PE2. The numbers of the sub-pixels SP1, SP2, SP3, and SP4 and the first and second pixel electrodes PE1 and PE2 may be varied in accordance with a required configuration, and shapes of the sub-pixels SP1, SP2, SP3, and SP4 and the first and second pixel electrodes PE1 and PE2 may be modified in accordance with a required configuration.

The light-blocking layer BM is formed in correspondence with the partition wall 440 and may include a first light-blocking layer BM1 and a second light-blocking layer BM2. The first light-blocking layer BM1 is extended in a first direction D1 and has a first width w1 that is equal to a width of the partition wall 440. For example, the first light-blocking layer BM1 is overlapped with the partition wall 440 and is formed at a boundary area defining the sub-pixels SP1, SP2, SP3, and SP4.

The second light-blocking layer BM2 is extended along the first direction D1 and a second direction D2 substantially perpendicular to the first direction D1. The second light-blocking layer BM2 has a second width w2 greater than a width of the partition wall 440. For example, the second light-blocking layer BM2 extends beyond an area of the partition wall 440 and into a portion of the sub-pixel SP. For example, the second light-blocking layer BM2 is formed at a corner area of the first and second pixel electrodes PE1 and PE2.

Motion directions of the conductive fluid 610 and the non-conductive fluid 620 may be set in accordance with a position of the second light-blocking layer BM2. For example, when a predetermined high voltage is applied to the first pixel electrode PE1 of the first sub-pixel SP1, the opaque oil 620 starts to be pushed out from a corner area of the first pixel electrode PE1 where the second light-blocking layer BM2 is formed. Moreover, when a predetermined high voltage is applied to the second pixel electrode PE2, the opaque oil 620 starts to be pushed out from a corner area of the second pixel electrode PE2 where the second light-blocking layer BM2 is formed.

Referring to FIG. 13, the color filters CF may be red, blue, green, or white. The color filters CF included in the main pixel MP include a red color filter, a blue color filter, a green color filter, and a white color filter. The same number of colors is disposed in the color filters CF. According to an exemplary embodiment of the present invention, one main pixel MP is configured by four sub-pixels SP. Colors of the first and second color filters CF1 and CF2 included in the first and third sub-pixels SP1 and SP3 are red and green, respectively, and colors of the first and second color filters CF1 and CF2 included in the second and fourth sub-pixels SP2 and SP4 are blue and white, respectively. For example, one main pixel MP has two color filters each having a color of red, green, blue, or white.

To display a red color on the main pixel MP, light may be allowed to transmit through the first color filters CF1 of the first and third sub-pixels SP1 and SP3 and light may be blocked through first and second color filters CF1 and CF2 of the second and fourth sub-pixels SP2 and SP4. Accordingly, by controlling the transmitting or blocking of light, a signal voltage is applied to the first pixel electrodes PE1 of the first and third sub-pixels SP1 and SP3.

To display a green color on the main pixel MP, light may be allowed to transmit through second color filters CF2 of the first and third sub-pixels SP1 and SP3 and light may be blocked through first and second color filters CF1 and CF2 of the second and fourth sub-pixels SP2 and SP4. Accordingly, by controlling the transmitting or blocking of light, a signal voltage is applied to the second pixel electrodes PE2 of the first and third sub-pixels SP1 and SP3.

To display a blue color on the main pixel MP, light may be allowed to transmit through first color filters CF1 of the second and fourth sub-pixels SP2 and SP4 and light may be blocked through first and second color filters CF1 and CF2 of the first and third sub-pixels SP1 and SP3. Accordingly, by controlling the transmitting or blocking of light, a signal voltage is applied to the first pixel electrodes PE1 of the second and fourth sub-pixels SP2 and SP4.

Accordingly, when a color is displayed, plural sub-pixels may be used so that a non-transmitting area may be reduced and a color luminance per a unit pixel may be increased.

Figure 14:
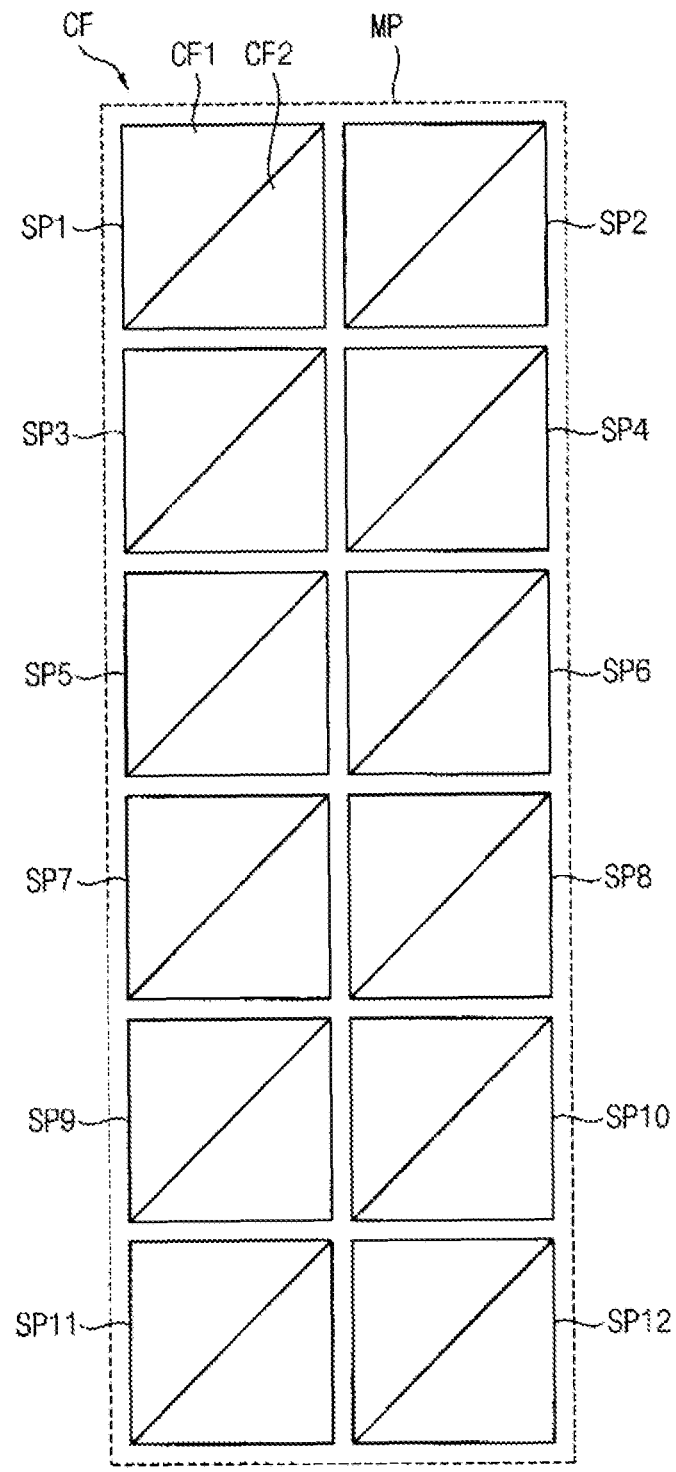
FIG. 14 is a plan view illustrating a main pixel according to an exemplary embodiment of the present invention and an operation expressing a color by the main pixel.

FIG. 14 is a plan view illustrating a main pixel according to an exemplary embodiment of the present invention and an operation for expressing a color by the main pixel.

Referring to FIG. 14, an electrowetting display device according to an exemplary embodiment of the present invention includes one main pixel MP formed by twelve sub-pixels SP1, SP2, SP3, SP4, SP5, SP6, SP7, SP8, SP9, SP10, SP11, and SP12 that are adjacent to each other. In this case, colors of first and second color filters CF1 and CF2 of the first and eighth sub-pixels SP1 and SP8 are red and green, respectively, and colors of first and second color filters CF1 and CF2 of the second and seventh sub-pixels SP2 and SP7 are white and blue, respectively. Moreover, colors of first and second color filters CF1 and CF2 of the third and tenth sub-pixels SP3 and SP10 are white and red, respectively, and colors of first and second color filters CF1 and CF2 of the fourth and ninth sub-pixels SP4 and SP9 are green and blue, respectively. Furthermore, colors of first and second color filters CF1 and CF2 of the fifth and twelfth sub-pixels SP5 and SP12 are blue and red, respectively, and colors of first and second color filters CF1 and CF2 of the sixth and eleventh sub-pixels SP6 and SP11 are white and green, respectively. Accordingly, one main pixel MP includes sixth color filters having a red, green, blue and white color filter.

To display a white color on the main pixel MP, light is permitted to transmit through first color filters CF1 of the first to twelfth sub-pixels SP1 to SP12 and light is blocked through second color filters CF2 of the first to twelfth sub-pixels SP1 to SP12. For example, a signal voltage is applied to the first pixel electrodes PE1 of all of the sub-pixels. In this case, red, blue and green colors displayed on the first, fourth, fifth, eighth, ninth and twelfth sub-pixels are mixed to be displayed as a white color.

When the electrowetting display device displays a white color or a clean image (having a highly transparent image), sub-pixels having plural white color may be used, so that a tranamittivity per a unit pixel may be increased.

As described above, according to exemplary embodiments of the present invention, an amount of an opaque oil injected is easily controlled, so that a high display quality may be realized. Moreover, a size of a non-transmitting area may be reduced to increase a transmissivity. Moreover, a utilizability of a non-transmitting area may be increased and a configuration of a color filter may be adapted, so that a tranamittivity per a unit pixel may be increased.

The foregoing is illustrative of various features of the present invention and the invention should not be construed as limiting the invention. Although a few exemplary embodiments of the present invention have been described, those skilled in the art will readily appreciate that many modifications are possible in the exemplary embodiments without materially departing from the present invention.

What is claimed is:

1. An electrowetting display device comprising:
    a first substrate comprising:
        a first base substrate,
        a first electrode layer formed on the first base substrate to comprise a plurality of pixel electrodes spaced apart from each other and a common notch electrode formed between each of the plurality of pixel electrodes,
        a hydrophobic insulation layer formed on the first electrode layer, and
        a partition wall formed surrounding each of the pixel electrodes of the plurality of pixel electrodes and surrounding the common notch electrode on the hydrophobic insulation layer;
    a second substrate opposite to the first substrate; and
    a conductive fluid and a non-conductive fluid, each interposed between the first and second substrates, the conductive fluid and the non-conductive fluid controlled to vary a transmittance of light in accordance with an electric signal applied to the plurality of pixel electrodes.

2. The electrowetting display device of claim 1, wherein a pixel electrode of the plurality of pixel electrodes is disposed between adjacent partition walls and the common notch electrode is disposed between the pixel electrodes forming a main pixel.

3. The electrowetting display device of claim 2, wherein the common notch electrode is formed at a central area of the main pixel.

4. The electrowetting display device of claim 3, wherein a size of the common notch electrode is about 30% or less of a size of each of the pixel electrodes of the plurality of pixel electrodes.

5. The electrowetting display device of claim 1, wherein each of the pixel electrodes of the plurality of pixel electrodes is a reflection electrode reflecting light.

6. The electrowetting display device of claim 1, wherein the second substrate comprises:
    a second base substrate; and
    a second electrode layer formed on the second base substrate.

7. The electrowetting display device of claim 6, wherein the common notch electrode and the second electrode layer are each configured to receive an identical voltage.

8. The electrowetting display device of claim 6, wherein the common notch electrode and the plurality of pixel electrodes are configured to receive different voltages.

9. The electrowetting display device of claim 1, wherein the hydrophobic insulation layer comprises:
    an organic layer formed on the first electrode layer; and
    a hydrophobic layer formed on the organic layer, the hydrophobic layer having a degree of wettability that is controlled in accordance with an electric signal applied to the plurality of pixel electrodes.

10. The electrowetting display device of claim 1, wherein the first substrate further comprises a light-blocking layer formed on the first base substrate in correspondence with the partition wall.

11. The electrowetting display device of claim 10, wherein the light-blocking layer comprises:
    a first light-blocking layer extended along a first direction and having a first width identical to a width of the partition wall; and
    a second light-blocking layer extended along a second direction, substantially perpendicular to the first direction, and having a second width greater than the width of the partition wall.

12. The electrowetting display device of claim 11, wherein the common notch electrode is disposed adjacent to the second light-blocking layer.

13. The electrowetting display device of claim 12, wherein a center portion of the second light-blocking layer has a convex shape.

14. The electrowetting display device of claim 13, wherein a center portion of the hydrophobic insulation layer has a concave shape at a portion where the second light-blocking layer is formed.

15. The electrowetting display device of claim 10, wherein the light-blocking layer comprises a third light-blocking layer extended in a first direction and a second direction, substantially perpendicular to the first direction, and having a second width greater than a width of the partition wall.

16. The electrowetting display device of claim 11, wherein the first substrate further comprises a switching element formed on the first base substrate and providing each of the pixel electrodes of the plurality of pixel electrodes with the electric signal.

17. The electrowetting display device of claim 16, wherein a contact hole electrically connected to the switching element is formed through each of the pixel electrodes of the plurality of pixel electrodes.

18. The electrowetting display device of claim 17, wherein a distance interval between the common notch electrode and the contact hole is about 20 µm or less.

19. The electrowetting display device of claim 16, wherein the first substrate further comprises a plurality of data lines and a plurality of gate lines formed on the first base substrate connected to the switching element, and
    wherein the data lines are overlapped with the common notch electrode.

20. An electrowetting display device comprising:
    a first substrate comprising:
        a first base substrate,
        a first electrode layer formed on the first base substrate to comprise a first pixel electrode and a second pixel electrode spaced apart from the first pixel electrode,
        a hydrophobic insulation layer formed on the first electrode layer, and
        a partition wall formed surrounding the first and second pixel electrodes on the hydrophobic insulation layer;
    a second substrate opposite to the first substrate; and
    a conductive fluid and a non-conductive fluid, each interposed between the first and second substrates, the conductive fluid and the non-conductive fluid controlled to vary a transmittance of light in accordance with an electric signal applied to the first and second pixel electrodes, wherein a color filter layer is formed on one of the first and second substrates, and wherein the color filter layer comprises a first color filter formed on an area of the color filter layer corresponding to the first pixel electrode and a second color filter formed on an area of the color filter layer corresponding to the second pixel electrode.

21. The electrowetting display device of claim 20, wherein the first and second pixel electrodes are disposed between adjacent partition walls and the first and second pixel electrodes and the adjacent partition walls form a single sub-pixel, and a plurality of sub-pixels adjacent to each other form one main pixel.

22. The electrowetting display device of claim 21, wherein each of the first and second color filters have a color that is red, green, blue, or white.

23. The electrowetting display device of claim 20, wherein the first pixel electrode and the second pixel electrode are configured to receive different voltages to control an arrangement of the conductive fluid and the non-conductive fluid.

24. The electrowetting display device of claim 20, wherein the second substrate comprises:
a second base substrate; and
a second electrode layer formed on the second base substrate.

25. The electrowetting display device of claim 24, wherein a voltage applied to one of the first and second pixel electrodes is the same as a voltage applied to the second electrode layer.

26. An electrowetting display device comprising:
a first substrate;
a second substrate opposite to the first substrate; and
a transparent fluid and an opaque fluid, each interposed between the first and second substrates, the relative arrangement of the transparent fluid and the opaque fluid controlled to vary a transmittance of light in accordance with a received electric signal,
wherein the first substrate comprises:
plurality of pixel electrodes spaced apart from each other;
a common notch electrode formed between each of the plurality of pixel electrodes; and
a partition wall formed surrounding each of the pixel electrodes of the plurality of pixel electrodes and the common notch electrode.

* * * * *